United States Patent
Schoennagel

(10) Patent No.: US 8,362,189 B2
(45) Date of Patent: Jan. 29, 2013

(54) CATALYST MIXTURE AND METHOD FOR THE PRODUCTION OF POLYESTERS WITH HIGH VISCOSITY

(75) Inventor: Matthias Schoennagel, Berlin (DE)

(73) Assignee: Uhde Inventa-Fischer GmbH, Berlin (DE)

( * ) Notice: Subject to any disclaimer, the term of this patent is extended or adjusted under 35 U.S.C. 154(b) by 0 days.

(21) Appl. No.: 13/253,180

(22) Filed: Oct. 5, 2011

(65) Prior Publication Data

US 2012/0088898 A1 Apr. 12, 2012

Related U.S. Application Data

(60) Provisional application No. 61/389,755, filed on Oct. 5, 2010.

(51) Int. Cl.
*C08G 64/00* (2006.01)
*C08G 63/00* (2006.01)

(52) U.S. Cl. ........ 528/272; 502/100; 502/152; 502/154; 502/162; 528/271; 528/279

(58) Field of Classification Search .................. 502/100, 502/152, 154, 162; 528/271, 272, 279
See application file for complete search history.

(56) References Cited

U.S. PATENT DOCUMENTS

| | | | | |
|---|---|---|---|---|
| 5,017,680 | A | * | 5/1991 | Sublett .......................... 528/274 |
| 7,608,652 | B2 | * | 10/2009 | Bashir et al. .................. 524/176 |
| 2008/0033084 | A1 | * | 2/2008 | Bashir et al. .................. 524/176 |

* cited by examiner

*Primary Examiner* — Terressa Boykin
(74) *Attorney, Agent, or Firm* — Marshall & Melhorn, LLC

(57) ABSTRACT

Provided are a catalyst mixture and also a method for the production of a polyester melt with high viscosity, the granulate obtained therefrom having an intrinsic viscosity of >0.70 dl/g and an L* color >70 and the b* color being between −5 and +5. The catalysts being used during the production are not based on heavy metals but on titanium compounds. Also no components of catalysts based on heavy metal are added. The granulate can be processed further in any way, e.g. to form bottles, containers, films, foils or fibers.

19 Claims, No Drawings

CATALYST MIXTURE AND METHOD FOR THE PRODUCTION OF POLYESTERS WITH HIGH VISCOSITY

RELATED APPLICATION

This application claims the benefit, under 35 U.S.C. 119 (e), of the provisional application filed Oct. 5, 2010 under 35 U.S.C. 111(b), which was granted Ser. No. 61/389,755, which has since expired. This provisional application is hereby incorporated by reference.

BACKGROUND OF THE INVENTION

The present invention relates to a catalyst mixture and also a method for the production of a polyester melt with high viscosity, the granulate obtained therefrom having an intrinsic viscosity of >0.70 dl/g and an L* colour >70 and the b* colour being between −5 and +5. The catalysts being used during the production are not based on heavy metals but on titanium compounds. Also no components of catalysts based on heavy metal are added. The granulate can be processed further in any way, e.g. to form bottles, containers, films, foils or fibres.

The invention relates to the production in particular of polyethylene terephthalate, subsequently termed PET. PET belongs to the group of polyesters which are characterised by the reaction of a dicarboxylic acid or esters thereof with a diol to form molecules with a long-chain construction. In the case of PET, the dicarboxylic acid is terephthalic acid, subsequently termed TPA, or the ester is dimethylterephthalate and the diol ethylene glycol, subsequently termed EG. At present, the world-wide PET production is approx. 36,000,000 metric tons per year and is used in particular in bottle production, the packaging industry, fibre production and in engineering polymer.

In 1937, Wallace H. Carother applied for a patent for the production of polyesters, in 1949 Whinfield and Dickson for polyesters based on TPA.

The production of polyesters at this time was produced exclusively in the batch method. Only after 1960 were continuous methods introduced, which made production on an industrial scale possible.

All continuous methods consist of the reaction steps of esterification and polycondensation. In the case of esterification, TPA and EG react to form a diester, termed bishydroxy-ethylterephthalate, in simplified terms BHET. This reaction is self-catalysed by the presence of H+ ions of the reaction partners and therefore requires no further externally supplied catalysts.

In the case of the subsequent polycondensation, essentially the carboxyl- and hydroxyl end groups present react with the emission of EG to form long molecule chains. The reaction speed of this reaction is influenced by increased temperature, dwell time, pressures in the vacuum range, surface renewal rates and very crucially by catalysts.

Whilst in 1949 Whinfield and Dickson still achieved higher molecular PET without the addition of catalysts after 72 hours dwell time, it was in fact soon recognised that catalysts based on antimony and titanium could reduce the dwell time to a few hours.

In the book Polyester Fibres, Chemistry and Technology, of 1975, Ludewig mentions the catalysts known up till then for polymerisation. Thereafter, the various catalysts, usually metal acetate salts, are subdivided into different reactivities. Catalysts, such as antimony-, germanium-, and titanium compounds, are thereby of the highest quality catalytically. Second-class catalysts for the polymerisation reaction are based on elements of the $1^{st}$ and $2^{nd}$ main group, in addition aluminium, lead and manganese.

In addition to the reactivity of a catalyst, the selectivity is however also of interest with respect to secondary reactions. In the case of PET, the mainly proceeding secondary reactions produce undesired yellow colourations or increased acetaldehyde- and diethylene glycol generation. With respect to selectivity, germanium and antimony should be mentioned in the first place and both catalysts, in particular the more reasonably priced antimony, have therefore been able to hold their ground over many decades relative to the more reactive titanium compounds.

A further important aspect in the use of catalysts is their complete or partial deactivation since all catalysts also catalyse degradative reactions to some extent, which become noticeable already in production or also only later in further processing or even only in the end product. As deactivation means, more commonly termed stabilisers, phosphorus compounds of all types have thereby proved their worth.

Continuous industrial processes for the production of PET divide the polymerisation to form high-molecular PET into two steps, melt polymerisation and solid-state polymerisation. In the first step, PET is polymerised in a melt with a molecular weight up to approx. 18,000 g/mol, which corresponds to approx. 100 monomer units or an intrinsic viscosity of approx. 0.60 dl/g.

Direct processing to form foils or fibres is effected subsequently or the polymer melt is supplied for granulation in order to obtain defined small PET granulate particles. This granulate is then supplied for solid-state postcondensation (subsequently termed SSP (solid state postcondensation)). Adjusting the molecular weight is effected by the level of the chosen temperature, generally between 210 and 225° C., and the dwell time. In order that the PET chips experience no oxidative damage, nitrogen is taken as carrier gas for heat input and for removal of the resulting reaction products. The level of the final molecular weight depends upon the desired end application. In the case of PET granulates for the production of PET bottles, the molecular weight is approx. 26,000 g/mol, which corresponds to approx. 140 monomer units or an intrinsic viscosity of approx. 0.80 dl/g.

Only since 2007 has there been a continuous industrial process by the company Uhde Inventa-Fischer in which a molecular weight of approx. 26,000 g/mol is already achieved in the melt. Hence the second complex SSP process is dispensed with and only conditioning with air in order to produce for example PET suitable for bottles is required.

In the last 10 to 20 years, great interest has been shown in catalysts for PET which are free of heavy metals, detectable in many discussions in world-wide PET congresses and a large number of patent applications relating to this topic. Not only can greater human and environmental acceptability thereby be detected as driving force but likewise an improvement in PET product qualities. In addition to antimony, also cobalt and bismuth count as heavy metals.

In order to replace antimony as catalyst, there are found in the patent literature all the elements and their compounds or combinations thereof mentioned already for preference in Ludewig, generally in combination with a P component. As varied and specific as all indicated antimony-free formulations are, they all however deal with a formulation for the production of high-molecular PET in the melt polymerisation up to a maximum intrinsic viscosity of approx. 0.60 dl/g and subsequent solid-state postcondensation.

In the state of the art, reference is made very explicitly to the huge difficulties, for highly-viscous polymer melts of approx. 0.80 dl/g, with yellow discolouration and acetaldehyde formation when using catalysts which are not based on antimony.

U.S. Pat. No. 7,368,522 relates to a method with antimony as catalyst, an intrinsic viscosity of at least 0.75 dl/g in the polymer melt (i.e. without SSP) with simultaneously good colours and a short reaction time being intended to be achieved. U.S. Pat. No. 7,368,522 thereby conjectures that this cannot be achieved with titanium formulations.

U.S. Pat. No. 6,559,271 B2 discloses a formulation based on titanium compounds in combination with cobalt which can also be used in addition up to 280° C. In this formulation, cobalt acts both as co-catalyst and as blue colourant in order to control the yellow tone. In order that the acetaldehyde contents can be controlled, the catalysts are deactivated with a P compound and in addition substances which bind acetaldehyde are used. This formulation can be used for higher molecular weights in the melt of 0.63 to 1.00 dl/g intrinsic viscosity but it is not free of heavy metals.

U.S. Pat. No. 7,094,863 B2 claims an antimony-free catalyst formulation for the production of in particular bottle granulate. In particular the improved product properties, such as clarity and dimensional stability for hot filling applications, are thereby highlighted. However, in addition to cobalt, also antimony contents up to 50 ppm are allowed in the formulation. The invention relates to the polyester production by means of SSP. Hence no high viscosities in the polymer melt are achieved with this formulation.

U.S. Pat. No. 7,544,762 B2 describes a formulation which is free of heavy metals and has good colours and low acetaldehyde contents, based on a titanium-phosphorus component. The maximum achieved viscosities of the melt are indicated at 0.64 dl/g.

US 2004/0044173 A1 describes a formulation which is free of heavy metals and has good colours and low acetaldehyde contents, based on a titanium-phosphorus component and the addition of element compounds of the group Ia, IIa, Mg, Fe or Co. The maximum achieved viscosities of the melt are indicated at 0.64 dl/g and require an SSP in order to achieve higher viscosities.

WO 2004/065452 A1 uses a Ti—Na-glycolate as catalyst system and reaches viscosities in the melt of 0.63 to 0.66 dl/g. Here also, an SSP is used to increase the molecular weight.

EP 1 013 692 uses a solid Ti catalyst, obtained by dehydrogenation of a titanium-halogen compound and reaction with a P compound and use of an Mg compound as co-catalyst. As an alternative to the Mg, elements of the IIa group and many heavy metals are mentioned. The achieved viscosities in the melt are at approx. 0.65 dl/g and require an SSP to achieve higher viscosities.

Furthermore, US 2007/010648 A1 relates to the use of a combination of Ti, Zr or Hf with 2-hydroxy-carboxylic acids and a quaternary ammonium compound instead of the normal Ti alkoxides. Here also the achieved viscosities in the melt are only at approx. 0.62 dl/g and require an SSP to achieve higher viscosities.

Qi et al. (EP 2 006 315) likewise use a titanium, phosphorus and co-catalyst system for the production of PET, the co-catalyst preferably being a mixture of Mg, Mn, Ca and Co. With Co, this mixture is also not free of heavy metals. Although also titanium compounds with lactic and citric acid are used, only a viscosity of approx. 0.67 dl/g in the melt is demonstrated with this system.

WO 2008/150350 A1 describes a Ti-based catalyst system with subsequent P addition for the PET production, with which a high viscosity in the melt can be achieved in a reduced reaction time with a low acetaldehyde content. The use of an SSP is thereby regarded as no longer required. The patent describes in addition the use of further additives, inter alia also the use of TiN. In contrast to the described process technology, only simple batch tests are however indicated in the examples. In contrast to commercial reality, extremely high quantities of toner (red 7-9 ppm, blue 13-18 ppm) are used and the colour values achieved are consequently extremely adulterated.

In the case of the catalysts known from the state of the art, it has however always been problematic to date that the obtained products have either sufficiently high viscosity, which led however to problems with discolouration, or had good colour values which led however to problems with viscosity.

SUMMARY OF THE INVENTION

Starting herefrom, it is the object of the present invention to indicate a catalyst mixture which can be used for the production of polyester melts, which ensures sufficiently high viscosity of the polyester melt and with which good colour values of the polyester melts can be achieved at the same time.

This object is achieved by the features of patent claim 1 with respect to the catalyst mixture, and by the features of patent claim 7 with respect to the method for the production of a polyester. The respective dependent patent claims thereby represent advantageous supplements.

DETAILED DESCRIPTION OF THE INVENTION

According to the invention, a catalyst mixture is hence provided which has, as minimum components, at least one catalyst selected from the group consisting of titanium-containing compounds, at least one co-catalyst selected from the group consisting of alkali- and/or alkaline earth metal-containing compounds and also at least one inorganic blue toner.

There are included thereby in the titanium-containing compounds used according to the invention as catalyst, all compounds in which titanium is present as compound with further atoms or molecules, for example titanium salts, titanium organyls etc. However titanium nitride is excluded herefrom.

The co-catalyst used according to the invention is thereby derived from compounds of the alkali- or alkaline earth metals, i.e. likewise inorganic or organic compounds of these metals, such as for example salts, organyls etc.

According to the invention, an inorganic blue toner is used: organic blue toners, such as for example colourants (e.g. blue toners, such as Polysyntren™ Blue RBL which are known from the state of the art) are not included herein.

Surprisingly, it was able to be established that, when using such a catalyst mixture in the polycondensation of corresponding educts for the production of polyesters, very good colour values and high viscosities of the produced polyester melt could be observed at the same time.

A preferred embodiment of the catalyst mixture according to the invention provides that, relative to the sum of the catalyst a) and of the co-catalyst b), the at least one catalyst is comprised at 1 to 90% by weight, preferably at 3 to 80% by weight, particularly preferred at 5 to 50% by weight, and/or the at least one co-catalyst at 99 to 10% by weight, preferably at 97 to 20% by weight, particularly preferred at 95 to 50% by weight. The quantities of catalyst or of co-catalyst are thereby selected independently of each other.

It is further advantageous if, relative to the sum of the at least one catalyst a) and of the at least one co-catalyst b), the at least one blue toner is comprised at 0.1 to 200% by weight, preferably at 1 to 100% by weight, further preferred at 5 to 50%, in particular at 10 to 30% by weight.

According to this preferred embodiment, the blue toner can be comprised in very small quantities, but, in the total content, can also exceed the content of catalyst and co-catalyst together.

It is particularly preferred if in addition at least one phosphorus-containing compound is comprised, preferably in a weight ratio at 5 to 700% by weight, further preferred at 10 to 300% by weight, particularly preferred at 20 to 100% by weight, in particular at 25 to 50% by weight, the content of phosphorus-containing compound being relative to the sum of the catalyst a) and of the co-catalyst b).

It is particularly preferred if, with respect to the materials, the previously mentioned components are selected from the following compounds:
a) the at least one catalyst a) from the group consisting of titanium citrate, titanium tartrate, titanium oxalate, titanium alkoxides, such as tetra-n-propyl-titanate, tetra-i-propyl-titanate, tetra-n-butyl-titanate, sodium titanate and potassium titanate,
b) the at least one co-catalyst b) from the group consisting of alkali- and/or alkaline earth metallic salts of organic carboxylic acids, in particular magnesium acetate, lithium acetate, sodium acetate, potassium acetate and calcium acetate,
c) the blue toner from the group consisting of main group metal- and/or transition metal nitrides, in particular titanium nitride and/or
d) the at least one phosphorus-containing compound from the group consisting of organic phosphates, in particular triethylphosphate, trimethylphosphate, triethylphosphonoacetate, phosphoric acid, mono-, di- or triesters of phosphoric acid with mono-, di- or triethylene glycol, phosphonic acid, mono- or diesters of phosphonic acid with mono-, di- or triethylene glycol, phosphinic acid, phenylphosphinic acid, esters of phosphinic acid with di- or triethylene glycol, polyphosphoric acid, esters of polyphosphoric acid with alcohols.

A particularly suitable catalyst mixture is distinguished by the following composition:
a) at least one catalyst a) at 3 to 12 parts by weight,
b) at least one co-catalyst b) at 5 to 100 parts by weight,
c) at least one blue toner c) at 1 to 10 parts by weight, and also
d) at least one phosphorus-containing compound d) at 10 to 50 parts by weight,
the quantities of components a) to d) being calculated such that they add up to 100% by weight.

The catalyst composition according to the invention is in particular free of heavy metals and/or heavy metal compounds. According to the invention, there is understood by a heavy metal, a metal with a density $\rho > 4.5$ g/cm$^3$ and also the compounds thereof. In particular, of concern hereby are Pb, Cd, Zn, Sb, Bi, Cu or Co and also compounds derived herefrom.

According to the invention, a method for the production of a polyester is likewise provided, in which a previously described catalyst mixture is used. The production method of the polyester can thereby be implemented by polycondensation of a mixture, comprising at least one sort of an organic dicarboxylic acid and at least one sort of an organic diol. It is crucial in the method according to the invention that a previously described catalyst mixture is added to the mixture used during the polycondensation. An addition of the catalyst mixture is likewise possible in the postesterification step, i.e. after conclusion of the polycondensation. The catalyst mixture can also be provided in both steps. There should be understood hereby the possibility, on the one hand, that the complete catalyst composition is added respectively in both steps; however also that the catalyst composition is added distributed over both steps in its individual components so that all the components of the catalyst composition add up to the entire composition only in the postesterification step.

In a particularly preferred embodiment, the addition of the catalyst mixture is effected in steps, firstly a catalyst mixture being added to a mixture of the educts, which catalyst mixture is free of a phosphorus-containing compound, and the phosphorus-containing compound being added at a later time.

An example of this preferred embodiment is that firstly a diacid with a diol is esterified for example in a polycondensation method. The catalyst mixture is then added without the phosphorus-containing compound into the postesterification step/prepolymerisation step and the phosphorus-containing compound is added at the end of the postesterification step/prepolymerisation step. The mixture is then supplied for polycondensation.

It is particularly preferred if, relative to the quantity of mixture used in the polycondensation, 1 to 10,000 ppm, preferably 5 to 1,000 ppm, particularly preferred 10 to 200 ppm, of the catalyst mixture are used. The concentration data relate thereby to weight relations.

The method is suitable in particular for polycondensation of terephthalic acid and ethylene glycol.

If necessary, the mixture used during the polycondensation can comprise at least one sort of a polybasic carboxylic acid and/or of a carboxylic acid ester derived herefrom and/or at least one sort of a polybasic alcohol.

Furthermore, it is preferred if, subsequent to the polycondensation, a granulation or pelletisation of the obtained polyester is effected, the obtained granulate or the pellets having an intrinsic viscosity of at least 0.70 dl/g, measured according to DIN 53728.

In particular, it is thereby advantageous that the obtained polyester has a b* colour, measured according to DIN 5033, of −5 to +5 and/or an L* colour, measured according to DIN 5033, of at least 70.

Advantages result also with respect to the fact that the obtained polyester is free of heavy metals.

The present invention is explained in more detail with reference to the subsequently cited examples without restricting the invention to the special parameters represented there.

Comparative Example Esterification Route PTA/EG

This example relates to a pilot plant for the continuous production of 50 kg/h polyethylene terephthalate (subsequently termed PET) with a standard antimony (Sb)- and phosphorus (P) formulation.

Terephthalic acid (subsequently termed PTA), isophthalic acid (subsequently termed IPA) and monoethylene glycol (subsequently termed EG) are placed together in a container with an agitator as a paste and supplied for an esterification step. The mass flow of the PTA is thereby 43.0 kg/h, the mass flow of the IPA 0.75 kg/h and the mass flow of the EG 32.7 kg/h.

The paste is supplied continuously for an esterification step with in total 76.45 kg/h, in which esterification step, at 274° C. and with excess pressure of 160 kPa, the PTA, IPA and EG react with each other to form a monomer with formation of water. The formed water is withdrawn from the reactor together with excess EG as vapours, the formed monomer is supplied for a postesterification step.

In the postesterification step, the polymerisation catalyst antimony in the form of antimony triglycolate (subsequently termed ATG), which is dissolved in EG, is metered into the end product for 270 ppm Sb at 274 to 278° C. and a pressure of 70 kPa. Resulting water and excess EG are withdrawn from the reactor as vapours.

After the postesterification step, the condensed monomer together with triethylphosphate dissolved in EG is supplied for the pre-polymerisation step for 16 ppm P in the end product.

In the pre-polymerisation, the monomer is condensed further to form an oligomer at 280° C. and 1 kPa, the PET polymer chain length thereby increases to approx. 15 basic units.

After the pre-polymerisation, the oligomer is supplied to a DISCAGE® polymerisation reactor in which the final polymer chain length of approx. 140 basic units is reached at 280° C. and 0.1 kPa.

The polymer melt is then supplied for underwater granulation by means of a pump where the melt is re-shaped into granules by means of water cooling and a cutting knife. The granules are separated from the adhering water in a centrifuge and supplied to a conditioning silo.

In the silo, the granulate is conditioned in a light air stream at approx. 170° C. for several hours.

EXAMPLE

This example relates to a pilot plant for the continuous production of 50 kg/h polyethylene terephthalate (subsequently termed PET) with an alternative catalyst formulation comprising titanium citrate, magnesium acetate, titanium nitride and triethylphosphate.

Terephthalic acid (subsequently termed PTA), isophthalic acid (subsequently termed IPA) and monoethylene glycol (subsequently termed EG) are placed together in a container with an agitator as a paste and supplied for an esterification step. The mass flow of the PTA is thereby 43.0 kg/h, the mass flow of IPA 0.75 kg/h and the mass flow of EG 32.7 kg/h.

The paste is supplied continuously for an esterification step with in total 76.45 kg/h, in which esterification step, at 274° C. and with excess pressure of 160 kPa, the PTA, IPA and EG react with each other to form a monomer with formation of water. The formed water is withdrawn from the reactor together with excess EG as vapours, and the formed monomer is supplied for a postesterification step.

In the postesterification step, titanium citrate is then dissolved in EG at 274 to 278° C. and a pressure of 70 kPa for 8 ppm Ti in the end product, magnesium acetate is dissolved in EG for 30 ppm Mg in the end product and titanium nitride is metered for 2.5 ppm in the end product. Resulting water and excess EG are withdrawn from the reactor as vapours.

After the postesterification step, the condensed monomer together with triethylphosphate dissolved in EG is supplied for the pre-polymerisation step for 20 ppm P in the end product.

In the pre-polymerisation, the monomer is condensed further to form an oligomer at 280° C. and 1 kPa, the PET polymer chain length thereby increases to approx. 15 basic units.

After the pre-polymerisation, the oligomer is supplied to a DISCAGE® polymerisation reactor in which the final polymer chain length of approx. 140 basic units is reached at 280° and 0.1 kPa.

The polymer melt is then supplied for underwater granulation by means of a pump where the melt is re-shaped into granules by means of water cooling and a cutting knife. The granules are separated from the adhering water in a centrifuge and supplied to a silo.

In the silo, the granulate is conditioned in a light air stream at approx. 170° C. for several hours.

TABLE

| After the silo, the following product qualities are measured: | | |
|---|---|---|
| | Comparative example | Example |
| intrinsic viscosity [dl/g] | 0.76 | 0.77 |
| colour L* | 78.0 | 78.0 |
| colour a* | −1.6 | −2.0 |
| colour b* | 0.9 | 2.0 |

Surprisingly, the obtained colour values of the example with high viscosity are comparably good; a slight increase in the viscosity could even be observed with otherwise identical conditions.

Determination of the Relative Viscosity

Determination of the relative viscosity is a standard method in quality control for the production of PET. The calculated intrinsic viscosity (subsequently termed IV) is in relation to the degree of polymerisation and the molecular weight.

Dry PET granulate (<0.5% by weight $H_2O$) is dissolved with agitation with approx. 200±0.2 mg for the determination in 40 ml of a 1:1 mixture comprising phenol and 1,2-dichlorobenzene at 130° C. for 30 minutes. After cooling and filtering the solution, the flow time of this solution is measured in a clean Ubbelohde capillary viscometer corresponding to DIN 51562 with a capillary diameter of 0.84 mm at exactly 25±0.1° C. The number of measurements is at least five successive measurements in which the time difference amongst each other is less than 0.2 seconds.

In the calculation of the result, firstly the relative viscosity is calculated from the flow time of the solution in relation to the flow time of the pure solvent. In order to preclude the influence of gravity, also the "Hagenbach-Couette time corrections" must be withdrawn. These factors can be deduced from the Ubbelohde capillary viscometer handbook.

$$\eta_{rel} = \frac{t - \Delta t}{t_0 - \Delta t_0}$$

t: flow time of the solution [s]
Δt: "Hagenbach-Couette time correction" for the solution [s]
$t_0$: flow time of the pure solvent [s]
$\Delta t_0$: "Hagenbach-Couette time correction" for the pure solvent [s]

The intrinsic viscosity can then be calculated as follows:

$$IV = \frac{-1 + \sqrt{1 + 4 * KH * (\eta_{rel} - 1)}}{2 * KH * c} \; [dl/g]$$

KH: HUGGINS constant, for this determination method KH=0.33
c: concentration of the PET granulate in the solvent [mg/ml] =[g/dl].

Determination of the Colour Values L*, a* and b*

The determination of the colour coordinates L*, a* and b* of crystalline PET granulate is effected in the CIE-LAB system with a colour spectrophotometer by Minolta in the wavelength range of 400 to 700 nm. The principle is that light from a standardised source is reflected by the surface of the PET granulates and the intensity of the reflected light is compared photoelectrically against a white standard body.

Before the measurement, the glass cell used must be cleaned, i.e. absolutely free of dust particles, other dirt or fingerprints. The glass cell is filled up to a level of approx. 1 cm. The colour spectrophotometer is used with the standard illumination type D65 and a standard observer of 10°. No gloss subtraction is effected. Thereafter, the actual measurement can be effected according to the operating manual by Minolta. The measurement is thereby effected three times, the glass cell being rotated by respectively 90°. In total, the glass cell is filled three times. The result is then averaged from nine measuring values.

What is claimed is:

1. A catalyst mixture for the processing of polyester, comprising
    a) at least one catalyst, selected from the group consisting of titanium-containing compounds,
    b) at least one co-catalyst, selected from the group consisting of alkali- and/or alkaline earth metal-containing compounds, and also
    c) at least inorganic blue toner, where
    the catalyst mixture does not contain antimony.

2. The catalyst mixture according to claim 1, wherein, relative to the sum of the catalyst a) and of the co-catalyst b),
    i) the at least one catalyst is comprised at 1 to 90% by weight, and/or
    ii) the at least one co-catalyst is comprised at 99 to 10% by weight.

3. The catalyst mixture according to claim 2, wherein, relative to the sum of the at least one catalyst a) and the at least one co-catalyst b),
    iii) the at least one blue toner is comprised at 0.1 to 200% by weight, and/or
    iv) in addition at least one phosphorus-containing compound is comprised, in a weight ratio at 5 to 700% by weight.

4. The catalyst mixture according to claim 1, wherein the at least one catalyst a) is selected from the group consisting of titanium citrate, titanium tartrate, titanium oxalate, titanium alkoxides, such as tetra-n-propyl-titanate, tetra-i-propyl-titanate, tetra-n-butyl-titanate, sodium titanate and potassium titanate,
    a) the at least one co-catalyst b) is selected from the group consisting of alkali- and/or alkaline earth metallic salts of organic carboxylic acids, in particular magnesium acetate, lithium acetate, sodium acetate, potassium acetate and calcium acetate,
    b) the blue toner is selected from the group consisting of main group metal- and/or transition metal nitrides, in particular titanium nitride, and/or
    c) the at least phosphorus-containing compound is selected from the group consisting of organic phosphates, in particular triethylphosphate, trimethylphosphate, triethylphosphonoacetate, phosphoric acid, mono-, di- or triesters of phosphoric acid with mono-, di- or triethylene glycol, phosphonic acid, mono- or diesters of phosphonic acid with mono-, di- or triethylene glycol, phosphinic acid, phenylphosphinic acid, esters of phosphinic acid with di- or triethylene glycol, polyphosphoric acid, esters of polyphosphoric acid with alcohols.

5. The catalyst mixture according to claim 1, characterized by the following composition:
    a) at least one catalyst a) at 3 to 12 parts by weight,
    b) at least one co-catalyst b) at 5 to 100 parts by weight,
    c) at least one blue toner c) at 1 to 10 parts by weight, and also
    d) at least one phosphorus-containing compound d) at 10 to 50 parts by weight,
    the quantities of components a) to d) being calculated such that they add up to 100% by weight.

6. The catalyst composition according to claim 1 being free of heavy metals and/or heavy metal compounds.

7. A Method for the production of a polyester by polycondensation of a mixture, comprising at least one organic dicarboxylic acid and at least one organic diol, or dicarboxylic acid diester and at least one organic diol, comprising steps wherein a catalyst mixture according to claim 1 is added to the mixture used during the polycondensation and/or the obtained mixture is subjected to a postesterification after conclusion of the polycondensation, the catalyst mixture being added in the postesterification step.

8. The method according to claim 7, wherein the addition of the catalyst mixture is effected in steps, firstly a catalyst mixture being added to the mixture used during the polycondensation, which catalyst mixture is free of a phosphorus-containing compound, and the phosphorus-containing compound being added at a later time.

9. The method according to claim 7, wherein, relative to the quantity of mixture used in the polycondensation, 1 to 10,000 ppm, preferably 5 to 1,000 ppm, particularly preferred 10 to 200 ppm, of the catalyst mixture are used.

10. The method according to claim 7, wherein the esterification product of terephthalic acid and ethylene glycol is used for the polycondensation.

11. The method according to 7, wherein the mixture used during the polycondensation comprises in addition:
    a) at least one sort of a polybasic carboxylic acid and/or of a carboxylic acid ester derived herefrom and/or
    b) at least one sort of a polybasic alcohol.

12. The method according to claim 7, wherein, subsequent to the polycondensation, a granulation or pelletisation of the obtained polyester is effected, the obtained granulate or the pellets having an intrinsic viscosity of at least 0.70 dl/g, measured according to DIN 53728.

13. The method according to claim 7, wherein the obtained polyester has a $b^*$ colour, measured according to DIN 5033, of −5 to +5 and/or an $L^*$ colour, measured according to DIN 5033, of at least 70.

14. The method according to claim 7, wherein the obtained polyester is free of heavy metals.

15. The catalyst mixture according to claim 2, wherein, relative to the sum of the catalyst a) and of the co-catalyst b),
    i) the at least one catalyst is comprised at 3 to 80% by weight, and/or
    ii) the at least one co-catalyst is comprised at 97 to 20% by weight.

16. The catalyst mixture according to claim 15, wherein, relative to the sum of the catalyst a) and of the co-catalyst b),
    i) the at least one catalyst is comprised at 5 to 50% by weight, and/or
    ii) the at least one co-catalyst is comprised at 95 to 50% by weight.

17. The catalyst mixture according to claim 3, wherein, relative to the sum of the at least one catalyst a) and the at least one co-catalyst b),
    iii) the at least one blue toner is comprised at 1 to 100% by weight, and/or
    iv) in addition at least one phosphorus-containing compound is comprised, in a weight ratio at 5 to 700% by weight.

18. The catalyst mixture according to claim 17, wherein, relative to the sum of the at least one catalyst a) and the at least one co-catalyst b), iii) the at least one blue toner is comprised at 5 to 50 by weight' and/or iv) in addition at least one phosphorus-containing compound is comprised, in a weight ratio at 10 to 300% by weight.

19. The catalyst mixture according to claim 18, wherein, relative to the sum of the at least one catalyst a) and the at least one co-catalyst b), iii) the at least one blue toner is comprised at 10 to 30% by weight, and/or iv) in addition at least one phosphorus-containing compound is comprised, in a weight ratio at 20 to 100% by weight.

* * * * *